United States Patent [19]

Pierce, III

[11] 4,364,638

[45] Dec. 21, 1982

[54] SIDE VIEW MIRROR PIVOTING ASSEMBLY FOR A VEHICLE

[75] Inventor: Ralph E. Pierce, III, Foster, R.I.

[73] Assignee: Truck Repair Service, Inc., Warwick, R.I.

[21] Appl. No.: 236,131

[22] Filed: Feb. 20, 1981

[51] Int. Cl.³ .............................................. G02B 5/08
[52] U.S. Cl. .................................................. 350/289
[58] Field of Search .................... 350/289; 74/501 M; 248/479

[56] References Cited

U.S. PATENT DOCUMENTS

| | | | |
|---|---|---|---|
| 3,469,901 | 9/1969 | Cook et al. | 350/289 |
| 3,480,355 | 11/1969 | Smith | 350/289 |
| 3,624,818 | 11/1971 | Stanfield | 350/289 |
| 3,650,607 | 3/1972 | Rogers et al. | 350/289 |
| 3,937,563 | 2/1976 | Frabe | 350/289 |

*Primary Examiner*—F. L. Evans
*Attorney, Agent, or Firm*—Barlow & Barlow

[57] ABSTRACT

A side view mirror assembly for trucks or similar vehicles is disclosed in which a mirror bracket that supports an elongated mirror is pivotally mounted to a door frame, and a motor having a rod or linear output is mounted on the door frame and is coupled to an arm that is also pivotally mounted on the door frame, the intermediate portion of the arm having a linkage that connects the arm to the mirror support bracket. Rocking motion of the arm produces rotation of the mirror support bracket, and in turn the mirror that is mounted thereon.

3 Claims, 5 Drawing Figures

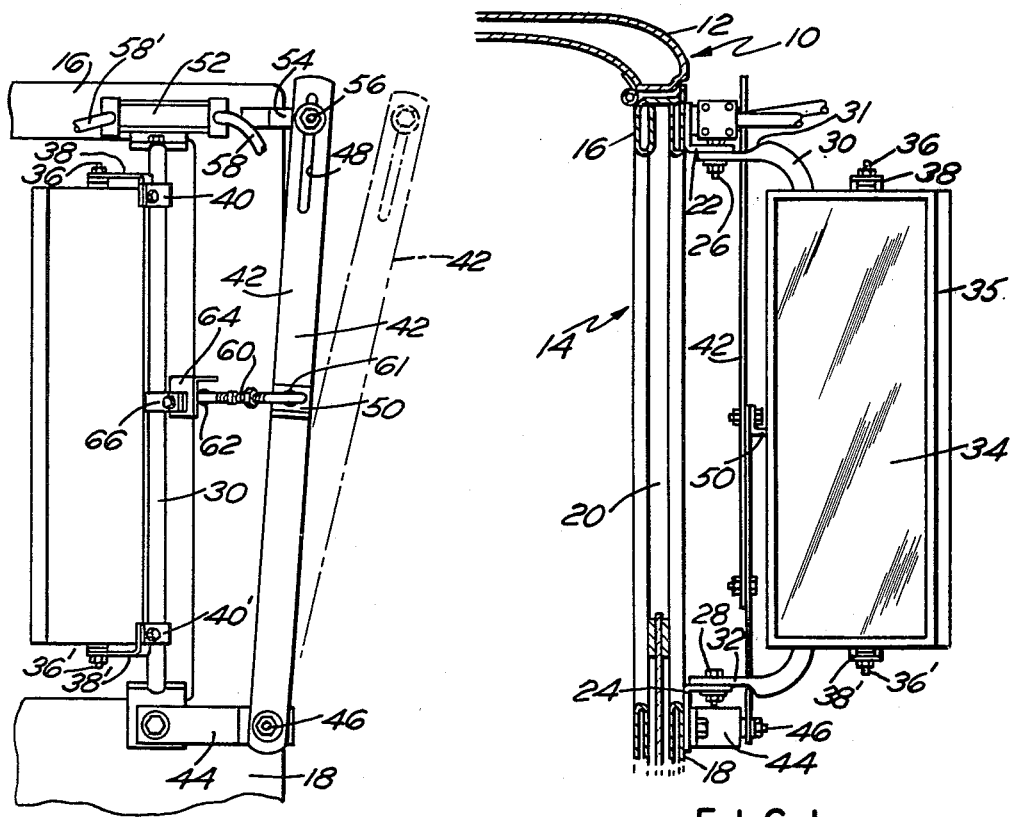
FIG. 2
FIG. 1
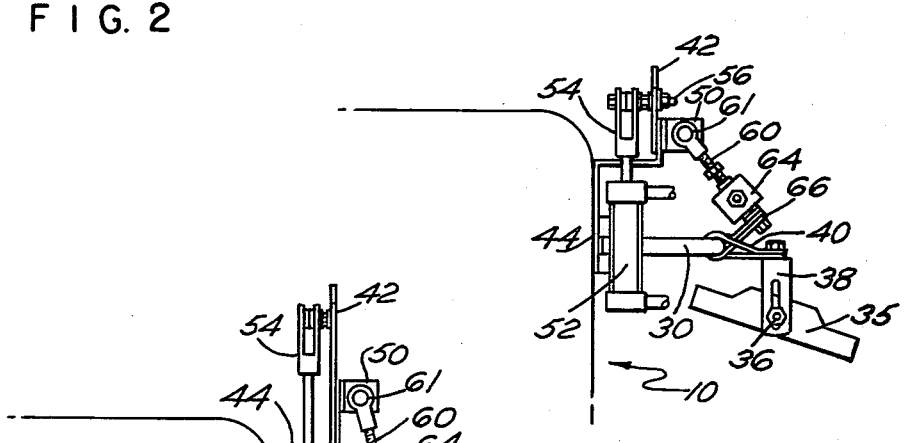
FIG. 3
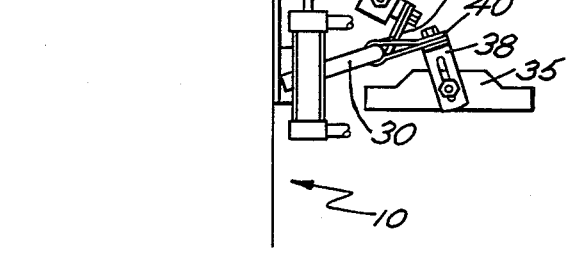
FIG. 4
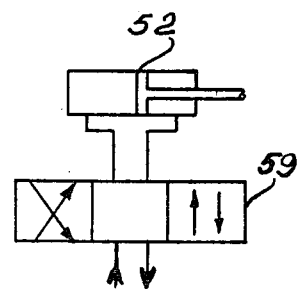
FIG. 5

SIDE VIEW MIRROR PIVOTING ASSEMBLY FOR A VEHICLE

BACKGROUND OF THE INVENTION

The present invention relates to exteriorily mounted rear view or side view mirrors that are primarily designed for trucks, and more particularly to a means for varying the position of the mirror in response to actuation by the driver. There is disclosed in the prior art a number of devices for producing movement of exteriorily mounted vehicle mirrors which are exemplified as for example in the White patent, U.S. Pat. No. 3,075,431 and the Clark patent, U.S. Pat. No. 3,596,079. These patents generally address the problem of a driver who is backing a trailer rig in a turn in such a way that he cannot see off to the right hand side of the trailer and wishes to insure that as he is backing the trailer, he is not backing into an obstruction that is not normally viewed by even a wide angle side view mirror as the field of view is restricted, since the tractor and the trailer are at an acute angle to each other, at least on the right hand side thereof, in this maneuver. One of the problems with the devices in the prior art is that the actuating mechanisms have utilized gearing arrangements which do not render them efficient for all-weather operation and cause malfunctions, as well as being electrically operated and exposed to the weather under all conditions.

SUMMARY OF THE INVENTION

The present invention provides a simple actuating mechanism for an existing side or rear view mirror for a truck or the like which can be readily connected by fastening a motor with a linear output, as for example an air or pneumatic cylinder, to one part of the door frame and a pivot block arrangement to the spaced part of the door frame. A pivoting arm is mounted between the block and the output rod of the cylinder, and a linkage is coupled between an intermediate portion of the arm and the mirror support bracket. In addition, the pivoting device for the existing mirror support bracket can be altered by changing the securing system, that is the bolt and nut arrangement, so as to provide a stiff and yet rotatable assembly. Then by connecting suitable power means to the cylinder, such as a pneumatic hose into a cab-mounted three-way valve, which is then connected to the source of air pressure, the installation is simply done in a minimum amount of time.

BRIEF DESCRIPTION OF THE DRAWINGS

FIG. 1 is a rear elevational view partly in section of the invention;

FIG. 2 is a fragmentary side elevational view thereof;

FIG. 3 and FIG. 4 are top plan views showing the invention in two different positions; and FIG. 5 is a pneumatic schematic.

DESCRIPTION OF THE PREFERRED EMBODIMENT

In the drawings, there is shown the cab of a tractor generally designated 10 having a roof portion 12 and a door portion generally designated 14 that has an upper frame portion 16 and a lower frame portion 18 that defines a window slot 20. The mirror assembly as illustrated comprises an upper L-shaped bracket 22 attached to the upper frame 16, and a lower L-shaped bracket 24 attached to the lower frame section 18. Pivotally attached to these brackets by bolts 26, 28 respectively, is a mirror support bracket 30 illustrated as being U-shaped and having flattened ends 31, 32 which are received about the pivoting bolts 26, 28 respectively. The U-shaped bracket in the present instance mounts a mirror 34 which is held in the frame 35 by providing fasteners 36, 36' that extend from the frame 35 and secure thereto L-shaped mounting brackets 38, 38' that in turn are fastened to clamping brackets 40, 40' (see FIG. 2 and 3) that clamp on to the U-bracket 30. It will be understood, of course, that other means of mounting the mirror frame may be had, and that this arrangement is shown purely by way of example of one manner in which a mirror may be mounted onto the door of a truck or other vehicle. The above described arrangement is one particular form which is in common use in the art today, although as will be known to those skilled in the art, other forms of mirror mounts are provided but in virtually every case, they consist of a U-bracket similar to the U-bracket 30 illustrated in the drawings herein.

A pivoting assembly for pivoting the mirror in its position as related to the U-bracket 30 consists essentially of providing an arm 42 which is mounted to the lower frame of the door by a bracket 44 which has a double bend therein in order to provide proper spacing from the side wall of the vehicle door, and which provides a pivot point by a pivot bolt 46. At the upper end of the arm 42 there is provided an elongated slot 48, while intermediate the arm is an L-shaped mounting bracket 50.

A pneumatic cylinder 52 which has a longitudinal output rod 54 is coupled by means of a bolt 56 that may slide in the slot 48. Cylinder 52 may be a conventional double acting pneumatic motor to which pneumatic hoses such as 58, 58' may be connected. As seen in FIG. 5 the motor is controlled by a three-way valve 59 connected to a source of air, or conceivably it could be any other suitable linear actuator device known to those skilled in the art. As seen by the broken line, the actuator rod 54 of the motor will rock the arm 42 into at least two extreme positions as seen in FIGS. 2, 3 and 4.

Connected to the intermediate bracket 50 on the arm 42 is an adjustable link 60 which has conveniently provided a ball and socket connection to the bracket 50 as at 61 and a ball and socket connection as at 62 to a bracket 64 that is clamped and fastened via a clamping strap 66 to the U-shaped mirror support bracket 30.

As will be apparent from examining FIGS. 3 and 4, as the arm 42 rocks from a near vertical position as seen in FIG. 3, where the normal mirror angle is provided for viewing from the cab in a substantially rearward line parallel to a trailer being towed by the tractor to the position as seen in FIG. 4, where the mirror is now extended in such a manner that the driver viewing the same will be able to see to a considerable distance to the right as seen in the drawing. The device provides extended side viewing for the driver of a tractor that is hauling a trailer. It will also be noted as the description has proceeded above, that the motor assembly and the actuating arm are readily adapted for attachment to standard truck mirrors, such as the one illustrated, without any modification of the mounting thereof. However, in some cases depending upon the construction or design of the vehicle some mounting hardware would have to be modified from that illustrated.

I claim:

1. A side view mirror pivoting assembly for a vehicle wherein a mirror support bracket is pivotally mounted to a door frame of a vehicle, said bracket supporting an elongated mirror thereon, the improvement for pivoting the bracket comprising a motor mounted on the door frame and having a reciprocating rod, said motor having means therein to produce linear motion of said rod, an arm having one end coupled to said rod, the other end of the arm pivoted to the door frame at a point spaced from said rod, a linkage connected at one end thereof to an intermediate portion of said arm and at the other end thereof to said bracket, whereby upon linear movement of the reciprocating rod the arm will rock and the linkage will rock the bracket and the mirror attached thereto.

2. A side view mirror pivoting assembly for a vehicle as in claim 1 wherein said motor is a pneumatic cylinder.

3. A side view mirror pivoting assembly for a vehicle as in claim 2 wherein said pneumatic motor is connected to a source of air through a three-way valve that services as a control device for said cylinder.

* * * * *